A. EXTON.
MACHINE FOR MOLDING CRACKERS, BISCUIT, &c.
No. 33,136. Patented Aug. 27, 1861.
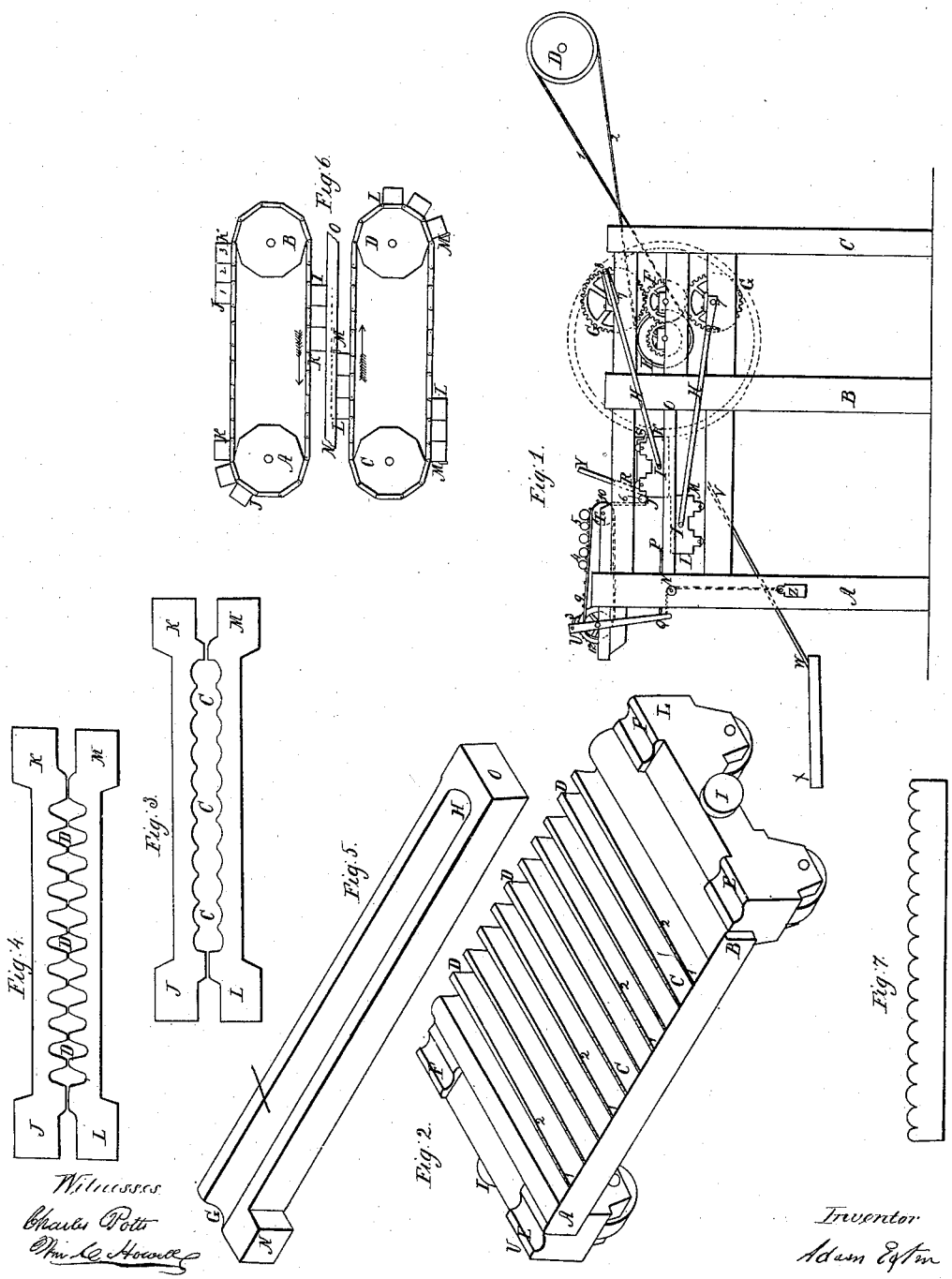

UNITED STATES PATENT OFFICE.

ADAM EXTON, OF TRENTON, NEW JERSEY.

BISCUIT-MACHINE.

Specification of Letters Patent No. 33,136, dated August 27, 1861.

*To all whom it may concern:*

Be it known that I, ADAM EXTON, of the city of Trenton, in the county of Mercer and State of New Jersey, have invented certain new and useful Improvements on the Machine for Molding Dough into Crackers, Biscuit, &c.; and I do hereby declare that the following is a full, clear, and exact description of the construction and operation of the same, reference being had to the annexed drawings, making part of this specification, in which—

Figure 1, is a side view of a molding machine whereon my improvement is applied. Fig. 2, is a perspective view of one of the fluted, or grooved plates used in said machine, whereby the dough is molded; Figs. 3 and 4, sections of the two molding plates, taken in different stages of the operation of molding. Figs. 5, 6, and 7 represent parts, or modifications of the said machine.

In Fig. 1, A, B, C, represent the posts, or legs, of the frame whereon the gearing and molding plates are supported and worked. D, the driving pulley or drum. F, G, G the cogged gearing connecting the pulley E, on the fly wheel shaft, with the two cranked shafts 7, 7, on which the spur wheels G, G are fastened. 1, 2, the driving belt. 7, 8 the cranks fixed on each end of the respective shafts. H, H connecting rods, uniting the pins on the cranks, with the pins, or bolts I, I, in the middle of each end of the two molding plates. J, K and L, M the two molding plates. N, O the guide rails, on, and against which, the two molding plates slide back and forth by the action of the cranks. P, Q a rod lying in the upper channel, or groove, of one of the guides N, O, and connected by a loose pin to the lower end of the lever Q, U. R, S another rod, bent downward at the end 5, and pinned loosely to the shutter or feed door R, Y. U, T rollers, or drums, on which an endless belt 9, 10 revolves, or passes, over. V, W the apron, or wire screen, whereon the dough balls fall when molded and slide thence down to the table W, X. Z, a weight suspended by a cord, over the pulley N, and fastened to the lower end of lever Q, U. 3 represents a pawl, or catch, on the upper end of lever U, and playing into; 12, a ratchet wheel on the end of feeding roller U. 4, 5 represent strips of dough placed on the feed belt, and 6, one of the strips in the feed hopper.

Fig. 2, represents the lower plate L, M showing the grooves or channels C, D of the molding surface thereof. The strip A, B, called the dough catcher, is attached to the end of the plate whereon the strips of dough from the feed hopper first fall in the process of molding. The upper molding plate J, K is made similar to the lower plate, except that the strip A, B, or dough catcher, is dispensed with. I, I in Fig. 2, represent the lugs cast on each end of the plates to which the connecting rods from the cranks are attached. To confine the molding plates to the guides during the operation of molding, small friction rollers are fitted on to each of the four corners of the plates and roll against the rails V and R of the frame Fig. 1. The parts of the plates E, F, in Fig. 2, are rounded off, to fit the hollow or grooved part of the guide rails N, O.

Fig. 5 shows a guide rail detached from the frame and G, H thereon the hollow or groove. The opposite side of the guide is similarly grooved, in order that it may be adapted for the upper and lower plate to work and slide thereon.

It will be readily understood from drawing Fig. 1 that the two molding plates J, K and L, M; from the action of the cranks when in motion, slide back and forth along the guides N, O, and that the fluted or grooved, surfaces of the two plates slide in contact with each other. The strips of dough to be molded into crackers, biscuit or the like, are placed on the feeding belt 9, 10 and the operation of molding is performed by the machine as follows: When the upper plate J, K (in Fig. 1) is drawn back as shown in the figure, it comes in contact with the bent end of the rod R, S and thus draws along with it said rod, and the shutter, or hinged door of the feed hopper R, Y, thereby opening said hopper and permitting the strip of dough therein (as 6 for instance) to fall thence on to the lower plate L, M. The motion of the machine being continued, the two plates move in opposite directions to each other, with the strip of dough between them, the fluted or grooved channels and ridges on the two contiguous faces of the plates, compress, divide and mold said strip of dough into separate balls, crackers or biscuit, which after passing through said channels or grooves, are discharged at the end L of the lower plate, and fall thence on to the screen or apron V X, and down it to the table W, X. When the upper plate J, K, slides from the end O, of the guide rail, toward the opposite end N, it releases the rod R, S; whence the door R Y of the feed hopper is drawn close, by the reaction of a weight or spring attached to it for that purpose. Again, as the said plate approaches the end of the guide at N, it comes in contact with the end P, of the rod P, Q, whereby the lever Q, U is pushed outward, from the frame of the machine—thus pushing the catch 3, the ratchet wheel 12, and the connected drums and belt 9, 10, together with the strips of dough thereon so that one of said strips falls into the feed hopper, as shown at 6 for instance, ready to be dropped from thence on the return of said plate toward the end O of the guide, and to be let fall from thence on to the lower plate as already described. The weight Z, is intended to react on the lever Q, U, as the upper plate is withdrawn from the rod Q, P.

Fig. 3 represents a section of the two molding plates, or the ends thereof, when the strips of dough are first received between said plates, and Fig. 4 shows a section of the same, when the strips of dough after being compressed, divided and molded into crackers, or balls of dough, are discharged from the lower plate on to the screen V, W as above described. To prevent the strips of dough from slipping, with the first action of the two plates thereon, I make a series of nicks, or indentations, on the leading part of the ridges of the channels, or grooves, on said plates as shown at 1, 2 in Fig. 2. It will be observed that the channels, or grooves, C, D as shown in Fig. 2, at the end C, where the strips of dough are first received between the plates, are made wide but shallow; and from thence gradually become narrow and deep, at the end D, where the balls of dough are discharged from the plates. From this peculiarity in the form of the channels, or grooves, the compressing and forcing of the divided pieces of dough along them in the process of molding, tends very much to improve the outer surface, or skin, of the crackers, or biscuit, thus formed.

Fig. 7 represents a section of a molding plate having the channels or corrugations thereon made for the molding of small cylindrical shaped crackers. The plates thus grooved are used and worked in the machine in the same manner as above described.

My improvements in molding machines consist principally in using two movable flat plates fluted, grooved or corrugated on the working faces thereof, combined with suitable machinery, so that the said plates shall work together, but in opposite directions in the operation of molding the dough. In Fig. 6, therefore is shown another arrangement or combination of machinery whereby the said plates may be moved and worked accordingly. In this figure, A, B and C, D represent four drums fitted to revolve on a suitable frame for the purpose. On each pair of endless chains A B and C D, are fastened the molding plates J K, and L M. The plates in this case may be made in sections of two or more pieces, so as to lie freely on the links of the chain, and to wrap on and around the respective drums during the operation. N, O in this figure represents the guide rail against which the molding plates slide, as they pass each other moving in contrary directions as shown by the two arrows. In the drawing two plates are shown in contact, in the position to receive the feed, or strip of dough, on the lower plate L, M, to be molded into crackers or biscuit, as the said plates are caused to move around said drum.

I do not claim either of the parts of the above described frame or gearing separately considered. Neither do I claim broadly the use of channeled, fluted, or grooved plates for molding dough; as in revolving cylinders, or where one of the plates is stationary as these are already known and used. But

What I claim and desire to secure by Letters-Patent, is—

The molding-plates J. K. L. M. with the flutes or grooves cut thereon substantially in the shape of a truncated-cone in combination with the cranks or the endless belt substantially as described and for the purposes therein set forth.

ADAM EXTON.

Witnesses:
CHARLES POTTS,
WM. C. HOWELL.